United States Patent [19]

Long et al.

[11] E Re. 28,979

[45] Reissued Sept. 28, 1976

[54] CONTROL SYSTEM FOR ROAD GRADER

[75] Inventors: George E. Long, Monroe; Floyd C. Johnson, Seattle; Dennis L. Reese, Kirkland, all of Wash.

[73] Assignee: Grad-Line, Inc., Woodinville, Wash.

[22] Filed: Mar. 19, 1975

[21] Appl. No.: 559,910

Related U.S. Patent Documents

Reissue of:

[64] Patent No.: 3,971,452
Issued: Feb. 12, 1974
Appl. No.: 125,293
Filed: Mar. 17, 1971

[52] U.S. Cl. ..... 172/4.5; 404/84
[51] Int. Cl.[2] ..... E02F 3/85
[58] Field of Search ..... 172/4.5, 793; 94/46; 250/202, 203; 37/DIG. 20

[56] References Cited

UNITED STATES PATENTS

| | | | |
|---|---|---|---|
| 2,961,783 | 11/1960 | Bowen et al. | 172/4.5 |
| 3,026,638 | 3/1962 | Hayner et al. | 172/4.5 |
| 3,303,589 | 2/1967 | Rivinius | 172/4.5 |
| 3,454,101 | 7/1969 | Breitbarth et al. | 172/4.5 |
| 3,486,564 | 12/1969 | Page et al. | 172/4.5 |
| 3,495,663 | 2/1970 | Scholl et al. | 172/4.5 |
| 3,554,291 | 1/1971 | Rogers et al. | 172/4.5 |
| 3,674,094 | 7/1972 | Kuntz | 172/4.5 |

*Primary Examiner*—Stephen C. Pellegrino
*Attorney, Agent, or Firm*—Dowrey & Cross

[57] ABSTRACT

A control system for a road grader adapted to maintain the working edge of the grader blade in a preset datum plane so as to establish a uniform graded condition of the surface worked by the blade, regardless of the inclination assumed by the motor grader or the relative angular position of the blade itself. The system includes grade sensor means mounted adjacent one end of the blade to follow a pre-selected grade datum, slope sensing means mounted in fixed relation with the blade for keeping the blade at a predetermined slope with rotation sensing means mounted on the blade supporting ring or circle to detect the relative angular position of the blade. The rotation sensing means provides a correction signal for maintaining the slope angle of the blade at a value which will keep the "cross slope" of the surface established at a predetermined value regardless of the rotary position of the blade relative to the direction of travel.

14 Claims, 5 Drawing Figures

GEORGE E. LONG
DENNIS L. REESE
FLOYD C. JOHNSON
INVENTORS

BY Seed, Berry & Lowney
ATTORNEYS

GEORGE E. LONG
DENNIS L. REESE
FLOYD C. JOHNSON
INVENTORS

BY Seed, Berry & Lowney
ATTORNEYS

GEORGE E. LONG
DENNIS L. REESE
FLOYD C. JOHNSON
INVENTORS

BY Seed, Berry & Lucey
ATTORNEYS

CONTROL SYSTEM FOR ROAD GRADER

Matter enclosed in heavy brackets [ ] appears in the original patent but forms no part of this reissue specification; matter printed in italics indicates the additions made by reissue.

BACKGROUND OF THE INVENTION

It is desirable, when grading subsurfaces for superspeed highways, airport runways, and the like that the grade as well as cross slope approximate the finished surface as closely as possible. This procedure ensures a finished paved mat of uniform thickness and strength. In the past the subsurface has been graded by motor graders which were operated by skilled operators having the capability of finishing a surface which would be quite acceptable. However, with increased mechanization and the increased demand for uniform surfaces laid to close tolerances, the "eyeball" method has proven to be unsatisfactory in many instances.

It is well known in the art to use a control console in the cab of a motor grader with means for presetting the slope of the blade and maintaining that slope by servo valves or the like actuated by a pendulum apparatus or its equivalent. The slope sensing mechanism for such systems may be mounted on the blade itself or on some part of the machine structure which is in fixed position relative to the blade. Although such systems may be made to accurately reflect the slope of the blade at all times relative to the horizontal, they do not always reflect the true "cross slope" of the plane being cut, i.e., the slope normal to the direction of travel of the vehicle. Significant error occurs when the blade is rotated away from a position perpendicular to the direction of travel, which is normally the case during operation.

It is likewise known in the art to have sensing means at one end of the blade including a wheel, skid or other means for detecting a predetermined grade datum including means, such as servo valves, to maintain one end of the blade in a working position in accord with any discrepancy signal received from the detecting means. The slope of the blade is then slaved to the grade controlled end. If desired, both ends of the blade could, of course, be controlled by some preset grade datum.

Although the use of slope and grade sensors has done a great deal to automate the road grader when working from a preset datum, such controls are not completely accurate. The grader blade is normally mounted on a turntable or ring-shaped circle, and the width of the swath of the blade is determined by the relative angle of the blade to the direction of movement of the grader. Some amount of angle on the blade is normally maintained for the purpose of moving material to one side of the blade and away from the cutting edge. Once a slope angle is determined and the blade set to this angle, if the operator were to narrow or widen the swath by rotating the turntable or "circle" and the attached blade the effective cross slope angle of the cutting edge of the blade and therefore the resultant cross slope of the graded surface, i.e., perpendicular to the direction of travel, is changed.

With the above-noted problems in mind, it is an object of the present invention to provide a control system for a motor grader or the like which assures that the cutting edge of the blade is maintained at the correct slope angle so as to cut at a constant predetermined "cross slope" angle, irrespective of the relative angularity of the blade.

Yet another object of the present invention is to provide a control system for a motor grader including means for maintaining the cutting edge of the blade at a slope angle which gives a constant "cross slope" angle regardless of the blade angle without further adjustment by the operator.

It is yet a further object of the present invention to provide a control system whereby the cutting edge of the blade of a motor grader or the like may be maintained in a constant preset datum plane, at the desired grade, requiring the operator only to steer the vehicle and control the rotary position of the grader blade.

DETAILED DESCRIPTION OF THE DRAWINGS

Figure 1:
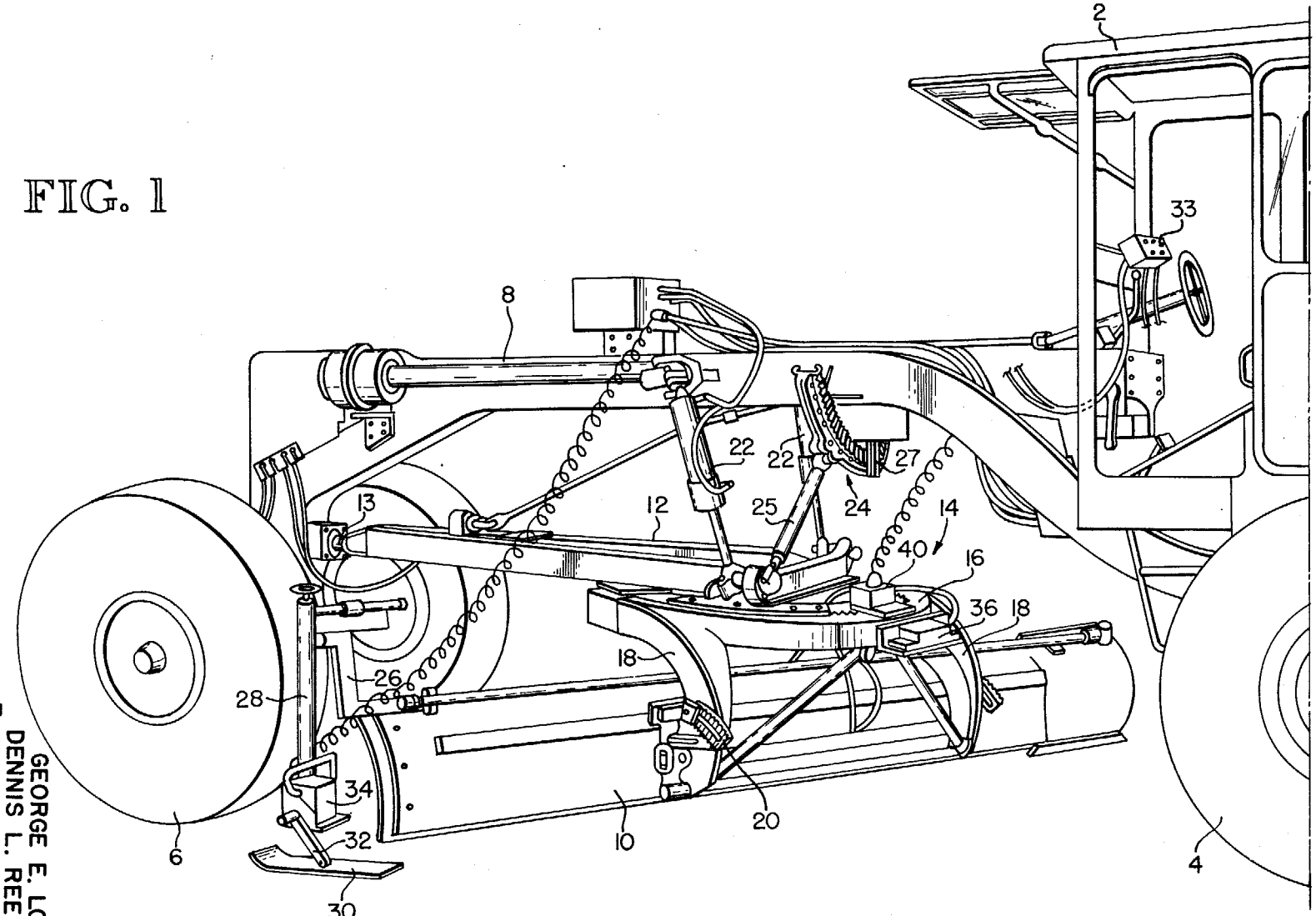
FIG. 1 is a partial view of a powered motor grader showing the portions essential to the present invention.

As can be seen in FIG. 1, the conventional grader includes a cab 2 for the operator, rear wheels 4, and front wheels 6, the wheels supporting a generally longitudinal frame member 8 which underlies the cab 2 and provides a support for the working blade 10. As is well known, the motor grader is quite long with wheels at either end of the frame and the working blade suspended between the front and rear wheels. Some graders have the frame divided allowing relative axial twisting but this feature does not affect the invention hereinafter described. The purpose for the extreme length of the grader is to smooth out the road surface by having the wheels straddle many of the minor or local variations. Suspended beneath the frame 8 and connected to the front end thereof, is a draw bar 12 having a universal ball joint connection 13 with the frame 8, allowing relatively free movement of the draw bar about this point.

Rigidly mounted to the rear portion of the draw bar 12 is a turntable arrangement indicated generally at 14 which has a fixed inner structure including a rotary drive gear (not shown) and a relatively movable outer portion 16 commonly known as the "circle" or "ring" to which the blade is attached by means of downwardly depending blade mounting arm 18. Although not shown or described in detail, the attachment of the blade to members 18 is adjustable by members 20 allowing the attack angle of the blade to be varied.

The height and slope of the blade relative to the wheels or ground surface is controlled by a pair of hydraulic rams 22 pivotally secured to the fixed portion of the turntable structure 14 and frame member 8. In practice one of the rams 22 will be controlled by a grade sensor to set the elevation of one end of the blade and the other ram will be used to control the slope of the blade by raising or lowering the opposite end of the blade. A conventional circle side shift mechanism, indicated generally at 24, having a link 25 extending between the fixed portion of the turntable structure 14 and a drive gear 27, may be used to shift the circle and attached blade to the left or right of a center position as desired by the operator. During this operation the draw bar 12 as well as the ring 16 and blade 10 are swung about the ball joint 13 thus changing the angular position of the blade relative to the direction of travel. As will be appreciated by those familiar with the art such side shifting by this mechanism will also introduce errors in the "cross slope" angle of the blade which will later be discussed more in detail. Some graders are equipped with rams which merely shift the blade laterally without affecting the position of the circle and thus do not disturb the slope setting. As noted above, the relative angle of rotation of the blade with respect to the direction of movement of the motor grader is determined by a drive gear which is a part of the fixed portion of the turntable 14, in a manner well known in the art and not deemed necessary to be described in detail.

Mounted at one end of the blade 10 is a bracket 26 having a downwardly extending vertical post 28 terminating in a skid 30 which is linked by the pivoted arm 32 to a grade sensor unit 34. The grade sensor unit may be in the form of a rotary variable differential transformer (RVDT) which is a commercially available unit, one example of which is the Angle Position Transducer, model No. R30A manufactured by Schaevitz Engineering, Pennsauken, New Jersey. Any vertical movement in the skid 30 relative to the blade 10 causes the skid to swing the arm 32 in a well-known manner and to actuate the RVDT, thus generating a signal which is used to actuate the servo-mechanism by means known in the art causing the blade to be either raised or lowered in accordance with the signal received. One end of the cutting edge of the blade is thus maintained at a predetermined grade or elevation during forward travel. As will be understood by those familiar with the art, such results may also be obtained by using a taut wire on which a sensor element, rather than the skid 30, rides.

Mounted on the movable ring or circle 16 is a slope sensor unit 36. As will be remembered, the blade 10 during operation is fixed relation to the circle 16 and thus the slope sensor unit 36 will give a true reflection of the actual slope of the blade regardless of its rotational position. The slope sensor unit 36 may constitute a linear variable differential transformer (LVDT) which is also commercially available in the form of a linear accelerometer. One example of such a unit is the Linear Variable Differential Transformer Accelerometer, model No. 7–66, manufactured by Edcliff Instruments, Monrovia, California. It will be understood, of course, that the slope sensor unit 36 may be located at any other desirable position on the circle or even on the blade itself depending upon its ability to withstand mechanical shock. The slope sensor or accelerometer 36 is actuated by any change in the actual slope of the blade 10 and is operatively connected to a console panel of the grader such that the slope can be preset and any variation of the blade from the preset slope will activate servo-mechanisms to operate one or the other of the rams 22 to return the blade to the preset slope value. This function will be later described in detail.

Mounted to the fixed portion of the turntable structure 14 is a rotation sensor unit which provides a correction signal related to the angularity of the blade with respect to a fixed reference point, normally coincident with the line of travel. The sensor unit 40 may constitute a nonlinear rheostat and will be operatively connected to control panel 33 such as to modify the preset slope reference signal in a maner hereinafter more fully described.

Figure 2:
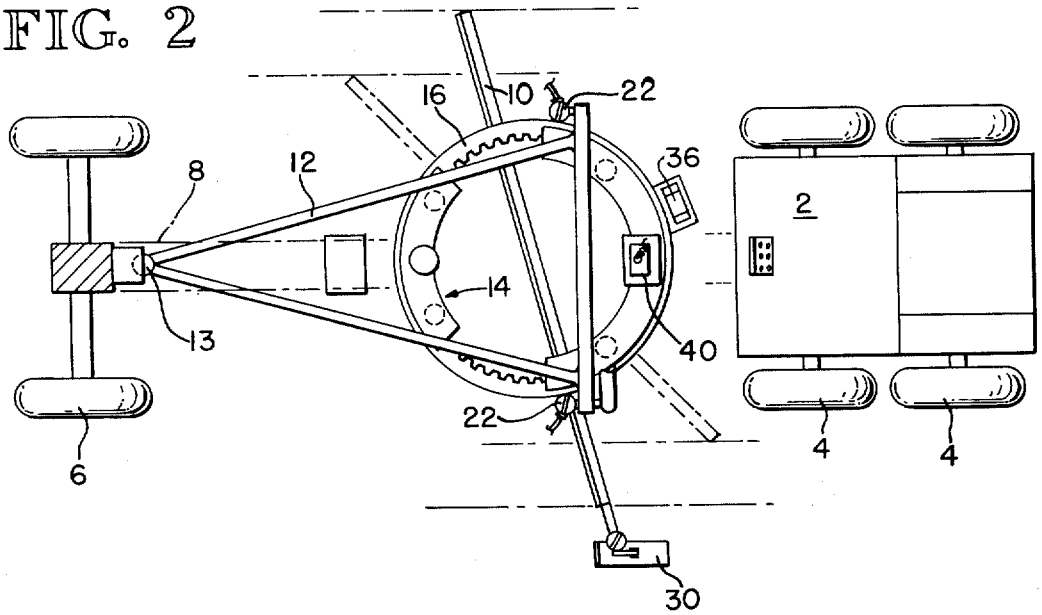
FIG. 2 is a plan view of a motor grader showing the difference in swath width obtainable by changing the angle of the blade relative to the direction of travel of the grader.

Referring now to FIG. 2, which is a plan view of the hereinabove described grader, it can be seen that movement of the circle 16 will cause the blade 10 to increase or decrease its swath with respect to the direction of movement of the grader. The greatest swath being available when the blade is approximately perpendicular to the direction of travel of the grader.

Figure 3:
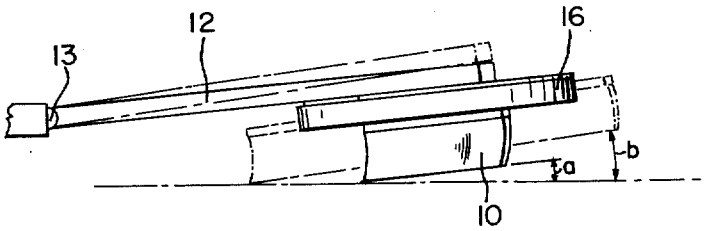
FIGS. 3 and 4 graphically illustrate how the effective angle of the cutting edge of the blade varies with angular adjustment of the blade with respect to the line of travel of the grader.
Figure 4:
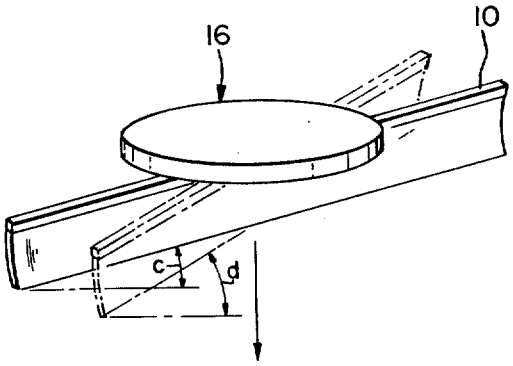

As can be seen in FIG. 3, movement of the blade 10, by rotation of the circle 16, from the position shown in solid lines, which would be relatively perpendicular to the direction of travel of the grader, to that shown in phantom lines, changes the effective cutting angle of the blade from angle a to angle b and if compensation were not made, the "cross slope" angle of the surface cut would be correspondingly altered although the actual slope of the blade relative to the horizontal and along the length of the blade would be unchanged. For clarity, the results of the change of the relative blade angle is shown from a different perspective in FIG. 4 wherein rotation of the blade a given amount changes the cross slope angle of the surface cut from angle c to angle d with the direction of travel of the grader being indicated by the arrow and the blade being rotated about the center of the circle 16 as an axis.

It can thus be seen that control of the cross slope of the graded surface involves not only the actual slope of the blade relative to the horizontal but also the rotational position of the blade relative to the direction of travel of the grader. Each of these factors must be taken into consideration and accounted for to obtain an accurately sloped surface.

Figure 5:
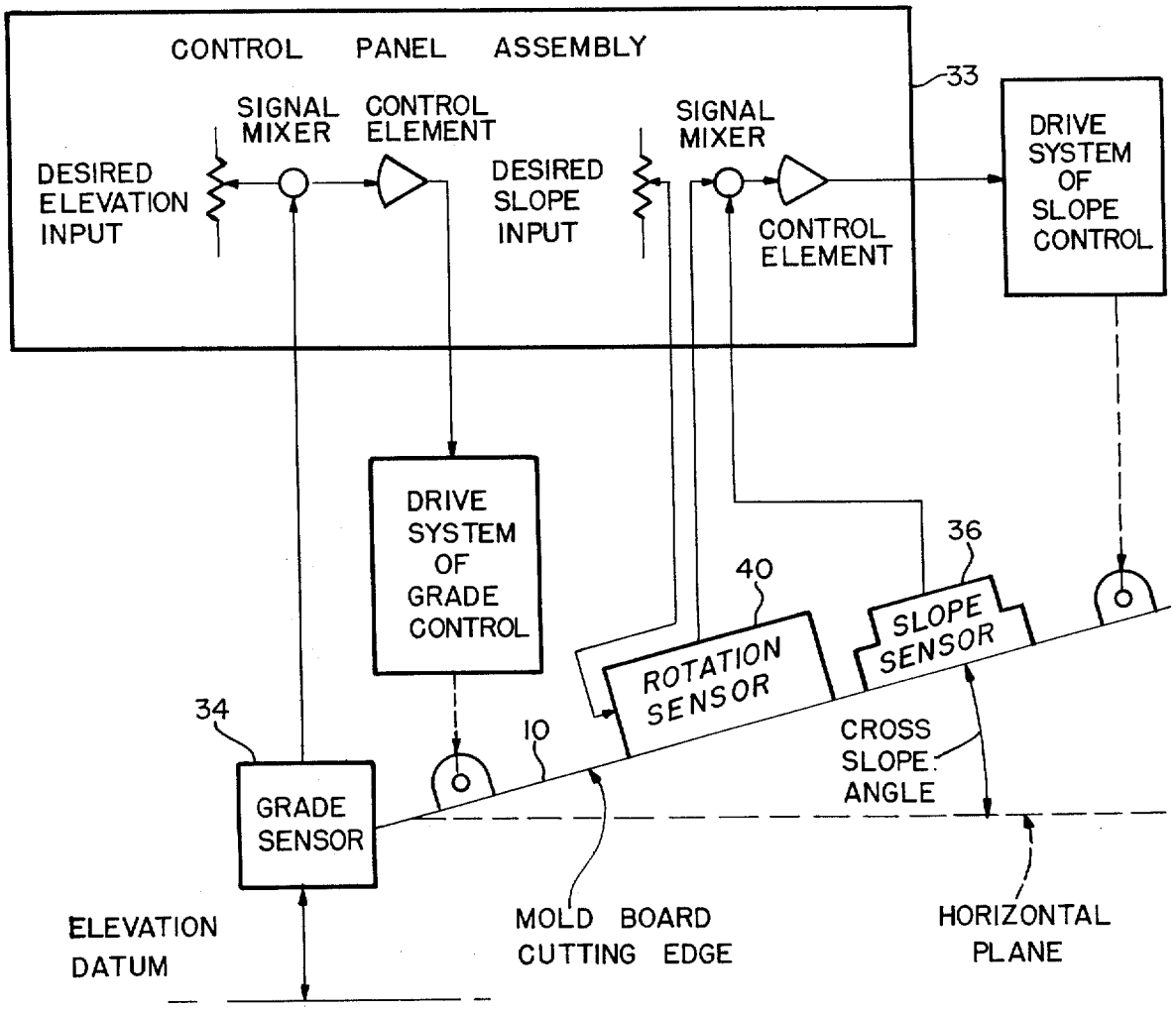
FIG. 5 is a schematic illustration of the grade and slope control system for a grader according to the present invention.

FIG. 5 is a schematic illustration of the control system involving both grade and cross slope control with rotational correction according to the present invention. The basic control system depicted in FIG. 5, except for the rotational correction system which is the subject of the present invention, is disclosed and claimed in a United States Pat. application Ser. No. 144,904, now abandoned, entitled CONTROL SYSTEM FOR PREDETERMINED SURFACES filed May 5, 1971 and assigned to the same assignee as the present application. As seen in FIG. 5, the cross slope angle is the angle between a horizontal plane and the plane established by the grader blade which is located in a vertical plane extending at right angles to the direction of travel of the grader. The latter vertical plane is represented by the surface of the sheet of drawings. As before described, the grade sensor 34 controls the elevation of one end of the grader blade 10 through a control system which utilizes a constant input signal representing the desired elevation and a constant signal from the grade sensor or RVDT 3. The grade sensor in the present example constitutes a rotary variable differential transformer, the rotary shaft of which is operated by the ski 30 as the machine moves forward. The differential transformer produces a voltage which is linearly proportional to its angular displacement in either direction from a null point. These voltages, of course, will be 180° out of phase and, at the null point, will cancel each other. These signals are mixed or compared by the signal mixer indicated in FIG. 5 which may be in the form of an appropriate bridge circuit or its equivalent. The constant input signal constitutes a suitable voltage source utilized as a desired elevation input as noted in FIG. 5. The desired elevation input is connected to one side of the bridge circuit as indicated and the other side of the bridge is connected to the output signal from the sensor 34. When the bridge is unbalanced the resultant of difference signal both in terms of direction and quantity is passed to the control element indicated which may be in the nature of an appropriate amplification circuit. The operator can thus create a null point for the sensor 34 by controlling the input signal to match the signal from the grade sensor regardless of the angle of the sensor arm 32 at any particular time. The signal from the control element is then used to actuate the drive system which may comprise hydraulic rams or electrical motors or their equivalents. The details of the necessary circuitry for the system are well within the skill of an artisan and not considered a part of the present invention. As aforementioned, with one end of the grader blade controlled by the grade sensor, the other end of the blade is then slaved to the grade controlled end by means of the slope sensor control system to be described.

The slope sensor unit or LVDT as previously described is utilized to create a signal proportional to any deviation from a preset inclination or slope value of the grader blade. The LVDT produces a continuous signal which varies with the inclination or slope of the unit. This signal is received by a signal mixer as indicated in FIG. 5 and compared with a constant preset slope input signal representing the desired slope. As in the case of the grade control system, the signal mixer may take the form of a bridge circuit with one side of the bridge being connected to the desired slope input voltage source and the other side being connected to the output signal from the slope sensor 36. When the bridge circuit is unbalanced, it produces a difference or error signal both directional and proportional. The difference signal is then passed to the control element represented as an amplification circuit in FIG. 5 which activates the drive system, raising or lowering the end of the blade. The rotation sensor 40 as depicted in the schematic is utilized to modify the preset slope input signal, as will be presently described so as to compensate for the error created by rotation of the grader blade as previously described.

Although the details of the rotation sensor 40 may be varied, one form which has been utilized is that of a nonlinear rheostat. The nonlinear characteristics of the rheostat may be developed from empirical data selected by testing a control system under known conditions. In actual practice, a plane was created that represented the desired surface to be graded by a motor grader and measurements were made from the resistance needed to compensate for rotation of the slope sensor in the plane away from a position perpendicular to the direction of travel. Curves were developed from the resistance measurements taken at different "cross slope" angles. These curves were found to differ by less than the measuring accuracies of the sensor units which allowed the curves to be normalized into one curve describing the characteristics of the nonlinear rheostat. As shown in FIG. 5, this specialized rheostat is then inserted between the input slope signal source and the signal mixer so as to automatically correct the input signal to compensate for the position of rotation of the grader blade.

Although the present system has been described relative to the error created by rotation of the ring 16, it will be understood that other adjustment mechanisms of the grader structure which affect the cross slope angle of the finished surface by altering the rotary position of the blade may be compensated for by the means described. For instance, in the embodiment of the grader shown in FIG. 1, error may be induced in the slope angle of the blade 10 by operation of the circle side shaft mechanism 24. A rotation sensor or position sensor responsive to the movement of this adjustment mechanism can also be used to additionally modify the slope input signal which is mixed or compared with the output signal of the slope sensor 36.

The present invention thus provides new, useful, and unobvious improvements in grade and slope control systems for motor graders or the like wherein error is introduced by rotary adjustment of the blade, mold board, or other working element. The invention makes it possible to eliminate guessing and human error allowing the operator to perform a given operation in less time than with the prior art and with greater accuracy.

The embodiments of the invention in which a particular property or privilege is claimed are defined as follows:

1. In a traveling machine having a movable frame, an elongated surface working element supported by said frame, and adjustment means on the machine to independently adjust the elevation of each end of the element and its rotational position relative to said frame, said machine being adapted to establish a planar surface having a predetermined cross [*shape*] *slope* angle defined as the angle between the surface established and a horizontal plane, said angle being located in a vertical plane perpendicular to the direction of travel of the machine, a control system comprising in combination;

grade sensing and control means operatively associated with said working element and said adjustment means for sensing a present grade datum and maintaining one end of said working element at a predetermined elevation related to said grade datum during travel of the machine, a slope sensing unit operatively associated with said working element and having means to produce a slope signal proportional to the degree of inclination of said element relative to a horizontal plane, input slope signal means providing a constant signal of predetermined value corresponding to the desired slope angle of the working element, slope signal mixing means adapted to produce a difference signal representing the difference between said input slope signal and said sensed slope signal, slope control means responsive to said difference signal for controlling said adjustment means for correcting the elevation of the other end of said working element to maintain said desired slope angle, and position sensing means operatively associated with said working element and responsive to the rotary position of said working element relative to the machine frame for modifying the given slope setting of said input slope signal means in relation to the rotary position of said working element, whereby said element establishes a planar surface having said predetermined cross slope regardless of the rotary position thereof during travel of said machine.

2. The control system according to claim 1 wherein, said slope sensing unit is mounted in fixed relation to said working element.

3. The control system of claim 1 wherein; said position sensing means is connected with said input slope signal means and adapted to produce a rotational correction signal related to the rotational position of the working element relative to the machine frame, said rotational correction signal being combined with said input slope signal to modify the same prior to being delivered to said slope signal mixing means.

4. The control system according to claim 2 wherein; said position sensing means is connected with said input slope signal means and adapted to produce a rotational correction signal related to the rotational position of the working element relative to the machine frame, said rotational correction signal being combined with said input slope signal to modify the same prior to being delivered to said slope signal mixing means.

5. In a traveling machine having a movable frame, an elongated surface working element supported by said frame, an adjustment means on the machine to adjust the elevation of at least one end of said element relative to said frame, said machine being adapted to establish a planar surface having a predetermined cross slope angle defined as the angle between the surface established and a horizontal plane, said angle being located in a vertical plane perpendicular to the direction of travel of the machine, a control system comprising in combination;

a slope sensing unit operatively associated with said working element and having means to produce a slope signal proportional to the degree of inclination of said element relative to a horizontal plane, input slope signal means providing a constant signal of predetermined value corresponding to the desired slope angle of the working element, slope signal mixing means adapted to produce a difference signal representing the difference between said input slope signal and said sensed slope signal, slope control means responsive to said difference signal for controlling said adjustment means for correcting the elevation of said one end of said working element to maintain said desired slope signal, and position sensing means operatively associated with said working element and responsive to the rotary position of said working element relative to the machine frame for modifying the given slope setting of said input slope signal means in relation to the rotary position of said working element, whereby said element establishes a planar surface having said predetermined cross slope regardless of the rotary position thereof during travel of said machine.

6. The control system according to claim 5 wherein, said slope sensing unit is mounted in fixed relation to said working element.

7. The control system of claim 5 wherein said position sensing means is connected with said input slope signal means [and adapted to produce with said input slope signal means] and adapted to produce a rotational correction signal related to the rotational position of the working element relative to the machine frame, said rotational correction signal being combined with said input slope signal to modify the same prior to being delivered to said slope signal mixing means.

8. The control system of claim 6 wherein; said position sensing means is connected with said input slope signal means and adapted to produce a rotational correction signal related to the rotational position of the working element relative to the machine frame, said rotational correction signal being combined with said input slope signal to modify the same prior to being delivered to said slope signal mixing means.

*9. In a traveling machine having a movable frame, a rotatable frame mounted on the movable frame for rotational movement about a rotatable frame axis perpendicular to a plane defined by the rotatable frame, an elongated surface working element supported on the rotatable frame for rotational movement about said rotatable frame axis, and adjustment means on the machine to adjust the elevation of one end of the working element relative to the other end and to adjust the rotational position of the working element around the rotatable frame axis relative to the movable frame, said machine being adapted to establish a planar surface having a predetermined cross slope angle defined as the angle between the surface established and a horizontal plane, said angle being located in a vertical plane perpendicular to the direction of travel of the machine, a control system comprising in combination;*

*a slope sensing unit for producing a sensed slope signal indicative of the degree of inclination of said working element relative to a horizontal plane,*

*mounting means for mechanically mounting said slope sensing unit for direct movement with said working element,*

*rotary position sensing means connected between said rotatable frame and said movable frame for producing a rotary position signal indicative of the rotational position of said working element around said rotatable frame axis relative to said movable frame, and*

*slope control means responsive to said sensed slope signal and said rotary position signal to control said adjustment means with respect to a desired working element slope angle in a manner to maintain the cross slope angle of the established surface constant, whereby the adjustment means will automatically modify the slope of the working element as the working element is rotated about the rotatable frame axis to maintain constant the cross slope of the established surface.*

*10. The control system according to claim 9 wherein said slope control means includes;*

*input slope signal means providing a constant input slope signal of predetermined value corresponding to the desired angle of the working element; and*

*first signal mixing means for producing a first difference signal representing the difference between said input slope signal and said sensed sloped signal.*

*11. The control system according to claim 9, further including;*

*grade sensing and control means connected with said working element and said adjustment means for sensing a preset grade datum and maintaining one end of said working element at a predetermined elevation related to said grade datum during travel of the machine.*

*12. The control system according to claim 11, wherein said grade sensing means is adapted to follow said preset*

*grade datum and to provide a grade signal related to deviation of said one end of the working element from the preset datum,*

*input grade signal means providing a constant signal of predetermined value corresponding to the desired elevation of said one end of the working element,*

*grade signal mixing means for producing a difference signal representing the difference between said input grade signal and said sensed grade signal, and*

*grade control means responsive to said difference signal for controlling said adjustment means for correcting the elevation of said one end of the working element.*

*13. The control system according to claim 10 wherein said input slope single means and said rotary position sensing means are operatively connected such that said constant input slope signal is modified by said rotary position signal before being supplied to said first signal mixing means.*

*14. The control system according to claim 13, further including;*

*grade sensing and control means connected with said working element and said adjustment means for sensing a preset grade datum and maintaining one end of said working element at a predetermined elevation related to said grade datum during travel of the machine.*

* * * * *